(12) United States Patent
Chen et al.

(10) Patent No.: US 11,279,776 B2
(45) Date of Patent: Mar. 22, 2022

(54) BLOCK COPOLYMER AND METHOD FOR PREPARING THE SAME

(71) Applicant: NATIONAL TSING HUA UNIVERSITY, Hsinchu (TW)

(72) Inventors: Chien-Tien Chen, Hsinchu (TW); Yi-Ya Liao, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 216 days.

(21) Appl. No.: 16/574,885

(22) Filed: Sep. 18, 2019

(65) Prior Publication Data

US 2020/0095363 A1    Mar. 26, 2020

(30) Foreign Application Priority Data

Sep. 20, 2018    (TW) ................................ 107133172

(51) Int. Cl.
| | | |
|---|---|---|
| *C08F 4/76* | (2006.01) | |
| *C08F 4/60* | (2006.01) | |
| *C08F 4/619* | (2006.01) | |
| *C08F 4/44* | (2006.01) | |
| C08F 297/02 | (2006.01) | |
| C08F 220/18 | (2006.01) | |
| C08F 220/38 | (2006.01) | |
| *C08F 4/70* | (2006.01) | |
| *C08F 4/80* | (2006.01) | |

(52) U.S. Cl.
CPC .................. *C08F 4/76* (2013.01); *C08F 4/44* (2013.01); *C08F 4/60* (2013.01); *C08F 4/619* (2013.01); *C08F 4/70* (2013.01); *C08F 4/7095* (2013.01); *C08F 4/7096* (2013.01); *C08F 4/7098* (2013.01); *C08F 4/80* (2013.01); *C08F 220/18* (2013.01); *C08F 220/38* (2013.01); *C08F 220/382* (2020.02); *C08F 297/026* (2013.01); *C08F 2800/20* (2013.01)

(58) Field of Classification Search
CPC .... C08F 4/44; C08F 4/60; C08F 4/619; C08F 4/64; C08F 4/70; C08F 4/7095; C08F 4/7096; C08F 4/7098; C08F 4/76; C08F 4/80

See application file for complete search history.

(56) References Cited

U.S. PATENT DOCUMENTS 4,866,145 A * 9/1989 Dicker ...................... C08F 4/42
526/190

FOREIGN PATENT DOCUMENTS

| CN | 1378576 A | 11/2002 | |
|---|---|---|---|
| GB | 2102818 A | * 2/1983 | ................ C08F 4/72 |

* cited by examiner

*Primary Examiner* — Ling Siu Choi
*Assistant Examiner* — David L Miller
(74) *Attorney, Agent, or Firm* — Muncy, Geissler, Olds & Lowe, P.C.

(57) ABSTRACT

A block copolymer and a method for preparing the same are disclosed. The method comprises the following steps: (A) mixing a compound of formula (I), a catalyst of formula (II), and a first solvent to obtain a first mixture; (B) adding a first monomer into the first mixture for reaction to obtain a second mixture; and (C) adding a second monomer into the second mixture for reaction to obtain a third mixture; wherein the compound of formula (I) and the catalyst of formula (II) are as defined in the specification.

12 Claims, No Drawings

BLOCK COPOLYMER AND METHOD FOR PREPARING THE SAME

CROSS REFERENCE TO RELATED APPLICATION

This application claims the benefits of the Taiwan Patent Application Serial Number 107133172, filed on Sep. 20, 2018, the subject matter of which is incorporated herein by reference.

BACKGROUND OF THE INVENTION

1. Field of the Invention

The present invention relates to a block copolymer and a method for preparing the same and, more particularly, to a triblock copolymer and a method for synthesizing a block copolymer by using an oxometallic complex as a catalyst.

2. Description of Related Art

Pigments are widely used in inks and paints because they have good stability to light, heat, water, etc., as compared to dyes. However, pigments are solid particles which are insoluble in water, so aggregation and uneven dispersion are likely to occur during preparation, use, or preservation, which accordingly affects the pigment quality. Therefore, the dispersibility of the pigments is one of the key factors affecting the quality.

Dispersants are often used as necessary additives and have the advantages of promoting dispersion of pigment particles and improving stability. However, conventional small molecule dispersants have poor stability and poor dispersion effect, and have gradually been replaced by polymer dispersants, among which block type polymer dispersants have received particular attention. In general, the synthesis of catalytic block copolymer mostly requires the use of 1 to 2 equivalents of the catalyst for reaction, which is low in reaction efficiency and high in cost.

Therefore, it is still necessary to continuously study the block copolymer for providing industrial utilization, and develop a new preparation method to simplify the process or reduce the cost.

SUMMARY OF THE INVENTION

In view of the above, the present disclosure provides a block copolymer and a method for preparing the block copolymer, which utilizes an oxometallic complex as a catalyst to catalyze the synthesis of the block copolymer and only needs to use a catalytic amount of catalyst for reaction, thereby reducing the cost. In addition, the oxometallic complex is biochemically absorbable and metabolizable, and thus can reduce the environmental burden.

The present disclosure provides a method for preparing a block copolymer. The method comprises the following steps: (A) mixing a compound of formula (I), a catalyst of formula (II), and a first solvent to obtain a first mixture; (B) adding a first monomer into the first mixture for reaction to obtain a second mixture; and (C) adding a second monomer into the second mixture for reaction to obtain a third mixture.

Further, the present disclosure also provides a block copolymer having a structure of formula (V) below:

$$[D]_x\text{-}[E]_y\text{-}[F]_z \qquad (V)$$

wherein D, E, and F are each independently a compound of formula (VI), and D, E, and F are different from each other; and x, y, and z are each independently an integer from 1 to 40; wherein the compound of formula (VI) is shown below:

(VI)

wherein $A_2$ is O, or S; $R_7$ is H, or a $C_{1-6}$ alkyl; and $R_8$ is a $C_{1-12}$ alkyl, $(CH_2)_qN(R_{11})_2$, $CH_2(CH_2OCH_2)_rCH_2N(R_{12})_2$, or $CH_2(CH_2OCH_2)_sCH_2OR_{13}$, wherein $R_{11}$, $R_{12}$, and $R_{13}$ are each independently a $C_{1-6}$ alkyl; and q, r, and s are each independently an integer from 1 to 10.

In the present disclosure, the compound of formula (I) is used as a starting material for synthesizing the block copolymer, wherein the compound of formula (I) is as follows:

(I)

wherein $A_1$ is a bond, O, or S; and $R_1$, $R_2$, and $R_3$ are each independently H, a $C_{1-6}$ alkyl, —$COOR_4$, or —$CH_2P(=O)R_5R_6$; or $R_1$ and $R_2$ are bonded to each other to form a $C_{4-8}$ cycloalkyl group or a $C_{3-7}$ heterocycloalkyl group; or $R_2$ and $R_3$ are bonded to each other to form a $C_{5-8}$ cycloalkyl group; wherein $R_4$, $R_5$, and $R_6$ are each independently a $C_{1-6}$ alkyl, a $C_{1-6}$ alkoxyl, —OTMS, or an amino group substituted by a $C_{1-6}$ alkyl.

In one embodiment of the present disclosure, it is optional for the compound of formula (I) that $A_1$ is O and $R_1$, $R_2$, and $R_3$ are each independently H or a $C_{1-6}$ alkyl, but the present disclosure is not limited thereto.

In the present disclosure, the catalyst used in the method for preparing a block copolymer is shown as the following formula (II):

$$[M(O)_a]^{m+}X_b^{n-} \qquad (II)$$

wherein M is an element of group IB, IVB, VB, VIB, VIIB, and VIIIB elements; X is Cl, Br, I, OH, OAc, OC(O)Ar, $OC(O)(CF_2)_cCF_3$, $OC(O)C_{12}H_{25}$, $[(OSO_2C_6H_4\text{—}CHCH_2)_n]$, OTf, OTs, $SO_4$, $SO_3C_{12}H_{25}$, acetylacetonate (acac), or a mixture thereof; a is an integer from 0 to 3; b is an integer from 1 to 4; in is an integer from 2 to 4; n is an integer from 1 to 2; and c is an integer from 1 to 6; wherein Ar is a $C_{6-20}$ aryl, and $[(OSO_2C_6H_4\text{—}CHCH_2)_n]$ has a structure of

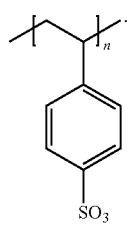

For the catalyst of formula (II) in the present disclosure, a may be 0, and M is Ti(IV), Zr(IV), Hf(IV), V(III), Fe(II/III), Cu(I/II), Mn(II/III), Co(II), or Ni(II).

For the catalyst of formula (II) in the present disclosure, $M(O)_a$ may be BiO, VO, $VO_3$, ZrO, HfO, $WO_2$, $MoO_2$, $CrO_2$, or $ReO_3$.

Among the catalyst of formula (II) in the present disclosure, $Hf(O)Cl_2$, $V(O)Cl_2$, $V(O)[(O_3SC_6H_4CHCH_2)_n]_2$, $V(O)Cl_3$, $V(O)(OTf)_2$, $V(O)(OCOR)_2$, $MoO_2Cl_2$, $Mn(O)(OCOR)$, $FeCl_3$, $Zr(O)Cl_2$, $Zr(OAc)_x(OH)_y (x+y=4)$, $Ti(O)(acac)_2$, $V(O)SO_4$, $V(O)(acac)_2$, $MoO_2(acac)_2$, $Mn(II)SO_4$, and $FeSO_4$ are included, but the present disclosure is not limited thereto, and the catalysts may be used singly or in combination thereof, wherein R is a $C_{6-20}$ aryl.

In one embodiment of the present disclosure, the content of the catalyst is not particularly limited as long as the synthesis of the block copolymer can be catalyzed. Preferably, the catalyst is present in an amount of from 0.1% to 20% by weight based on a total weight of the first mixture, for example from 0.1% to 15% by weight, from 0.1% to 10% by weight, or from 0.1% to 5% by weight, but the present disclosure is not limited thereto.

In one embodiment of the present disclosure, after the third mixture is obtained in step (C), the third monomer is further added into the third mixture to obtain a fourth mixture.

In the present disclosure, the first monomer, the second monomer, and the third monomer are each independently an acrylate compound or a diacrylate compound.

In one embodiment of the present disclosure, the acrylate compound may be a compound of formula (III) below:

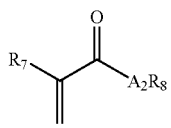

(III)

wherein $A_2$ is O or S; $R_7$ is H or a $C_{1-6}$ alkyl; and $R_8$ is a $C_{1-12}$ alkyl, $(CH_2)_qN(R_{11})_2$, $CH_2(CH_2OCH_2)_rCH_2N(R_{12})_2$, or $CH_2(CH_2OCH_2)_sCH_2OR_{13}$; wherein $R_{11}$, $R_{12}$, and $R_{13}$ are each independently a $C_{1-6}$ alkyl; and q, r, and s are each independently an integer from 1 to 10.

In one embodiment of the present disclosure, it is optional for the compound of formula (III) that $A_2$ is O; $R_7$ is H or a $C_{1-6}$ alkyl; and $R_8$ is a $C_{1-10}$ alkyl, $(CH_2)_qN(R_{11})_2$, $CH_2(CH_2OCH_2)_rCH_2N(R_{12})_2$, or $CH_2(CH_2OCH_2)_sCH_2OR_{13}$; wherein $R_{11}$, $R_{12}$, and $R_{13}$ are each independently a $C_{1-6}$ alkyl; and q, r, and s are each independently an integer from 1 to 6.

In one embodiment of the present disclosure, the diacrylate compound may be a compound of formula (IV) below:

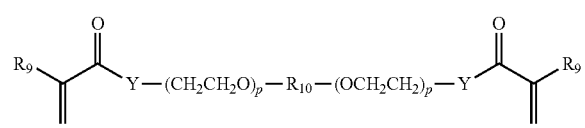

(IV)

wherein Y is O, NH, or S; $R_9$ is H, or a $C_{1-6}$ alkyl; $R_{10}$ is a $C_{1-6}$ alkyl, or a $C_{6-20}$ aryl; and p is an integer from 1 to 12.

In one embodiment of the present disclosure, it is optional for the compound of formula (IV) that Y is O or NH; $R_9$ is H or a $C_{1-6}$ alkyl; $R_{10}$ is a $C_{1-6}$ alkyl or a $C_{6-20}$ aryl; and p is an integer from 1 to 8.

In the method according to one embodiment of the present disclosure, after step (C), a step (D) of adding the third mixture into a second solvent may be further included. The second solvent is not particularly limited as long as it can induce the product to precipitate. For example, the second solvent may be water, an alcohol, a $C_{5-10}$ alkane, or a mixture thereof. In particular, the alcohol comprises methanol, ethanol, n-propanol, isopropanol, 2-butanol, n-butanol, isobutanol, tert-butanol, n-pentanol, isopentanol, 2-methyl butanol, sec-amyl alcohol, or a mixture thereof, but the present disclosure is not limited thereto. The $C_{5-10}$ alkane comprises pentane, hexane, heptane, octane, nonane, decane, cyclopentane, cyclohexane, cycloheptane, cyclooctane, or a mixture thereof, but the present disclosure is not limited thereto.

In the method according to another embodiment of the present disclosure, after step (C), a step (E) of adding the fourth mixture into a second solvent may be further included. The second solvent is not particularly limited as long as it can induce the product to precipitate. The second solvent is water, an alcohol, a $C_{5-10}$ alkane, or a mixture thereof. In particular, the alcohol comprises methanol, ethanol, n-propanol, isopropanol, 2-butanol, n-butanol, isobutanol, tert-butanol, n-pentanol, isopentanol, 2-methyl butanol, sec-amyl alcohol, or a mixture thereof, but the present disclosure is not limited thereto. The $C_{5-10}$ alkane comprises pentane, hexane, heptane, octane, nonane, decane, cyclopentane, cyclohexane, cycloheptane, cyclooctane, or a mixture thereof, but the present disclosure is not limited thereto.

In one embodiment of the present disclosure, the first solvent is not particularly limited as long as it can serve as a solvent for the reaction. Preferably, the first solvent is an ether solvent, such as tetrahydrofuran or ethyl ether, but the present disclosure is not limited thereto.

In one embodiment of the present disclosure, it is optional for the structure of formula (V) that x, y, and z are each independently an integer from 1 to 20. For example, x, y, and z are each independently an integer from 1 to 15, but the present disclosure is not limited thereto.

In one embodiment of the present disclosure, it is optional for the compound of formula (VI) that $A_2$ is O; $R_7$ is H or a $C_{1-3}$ alkyl; and $R_8$ is a $C_{1-8}$ alkyl, $(CH_2)_qN(R_{11})_2$, $CH_2(CH_2OCH_2)_rCH_2N(R_{12})_2$, or $CH_2(CH_2OCH_2)_sCH_2OR_{13}$, wherein $R_{11}$, $R_{12}$, and $R_{13}$ are each independently a $C_{1-3}$ alkyl; and q, r, and s are each independently an integer from 1 to 6.

In one embodiment of the present disclosure, the block copolymer comprises an end group represented by formula (VII) below:

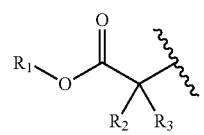

(VII)

wherein $R_1$ is a $C_{1-6}$ alkyl; and $R_2$ and $R_3$ are each independently H or a $C_{1-6}$ alkyl.

In one embodiment of the block copolymer of the present disclosure, at least one of D, E, and F is a compound of formula (VIII) below:

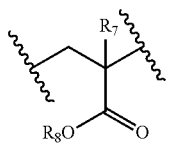

(VIII)

wherein $R_7$ is H or a $C_{1-6}$ alkyl; and $R_8$ is $(CH_2)_qN(R_{11})_2$ or $CH_2(CH_2OCH_2)_rCH_2N(R_{12})_2$, wherein $R_{11}$ and $R_{12}$ are each independently a $C_{1-6}$ alkyl; and q and r are each independently an integer from 1 to 10.

In one embodiment of the block copolymer of the present disclosure, it is optional for the compound of formula (VIII) that $R_7$ is H or a $C_{1-3}$ alkyl; and $R_8$ is $(CH_2)_qN(R_{11})_2$ or $CH_2(CH_2OCH_2)_rCH_2N(R_{12})_2$, wherein $R_{11}$ and $R_{12}$ are each independently a $C_{1-3}$ alkyl; and q and r are each independently an integer from 1 to 6.

DETAILED DESCRIPTION OF THE PREFERRED EMBODIMENT

The detailed description of the present disclosure is described below by way of specific embodiments, and those skilled in the art can readily appreciate the other advantages and efficacies of the present disclosure from the specification. The present disclosure may also be implemented or applied by other different embodiments. The details of the specification may also be applied to various aspects and applications, and various modifications and variations may be made without departing from the spirit of the present invention.

Synthesis of the Catalyst

In the present embodiment, the catalyst can be synthesized according to the following reaction formulae.

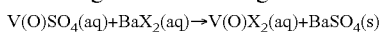

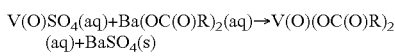

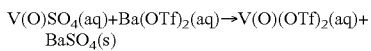

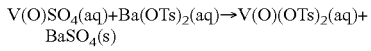

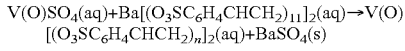

Vanadium sulphate ($VOSO_4$-$5H_2O$, 2.5 mmol) was placed in a dry double-necked round bottom flask (50 mL), followed by anhydrous methanol (2.5 mL). To the resulting solution, a solution of $BaX_2$ (1 equivalent, 2.5 mmol) (for example, $Ba(OAc)_2$, $BaOTs_2$, $BaOTf_2$, or $Ba[(O_3SC_6H_4CHCH_2)_n]_2$) in methanol (2.5 mL) was slowly added at room temperature. After stirring for 30 minutes, the reaction mixture is cloudy and is accompanied by a large amount of barium sulfate precipitation. The mixture was filtered through a plug of celite, and the obtained filtrate was evaporated to give a dark blue solid. The resulting solid was dried under vacuum at 120° C. for 4 hours. The product obtained can be stored in a dry box for several weeks and can be used directly.

Synthesis of Block Copolymer

Example 1

To a round bottom flask (100 mL) containing the benzoic acid oxovanadium catalyst (2.5 mg), 1-methoxy-2-methyl-1-(trimethylsilyloxy)propene (MTS, 0.20 mL, 0.99 mmol) dissolved in tetrahydrofuran (20 mL) was added. The round bottom flask was previously sealed with a membrane and purged with argon gas. Then, butyl methacrylate (BuMA, 2.2 mL, 11.2 mmol) was injected, and the temperature was raised from 20° C. to 33° C. After 30 minutes, the exothermic reaction was weak, and two 0.1 mL aliquots of the reaction solution were extracted and analyzed by GPC and $^1$H NMR, respectively. Afterwards, 2-(dimethylamino)ethyl methacrylate (DMAEMA, 2.65 mL, 15.7 mmol) was added and the temperature was observed to rise from 22° C. to 34° C. The crude product was poured into hexane to induce precipitation, and the purified copolymer was filtered to remove small molecule impurities, obtaining a final product.

$^1$H NMR (400 MHz, $CDCl_3$) δ 0.88 (br, 55H), 0.94 (br, 56H), 1.04 (br, 39H), 1.40 (br, 40H), 1.61 (br, 35H), 1.81-1.90 (br, 82H), 2.28 (br, 107H), 2.56 (br, 36H), 3.94 (br, 33H), 4.06 (br, 35H).

Mn=4104 (THF); Mw=4785; PDI=1.17.

Example 2

To a round bottom flask (100 mL) containing the benzoic acid oxovanadium catalyst (2.5 mg), 1-methoxy-2-methyl-1-(trimethylsilyloxy)propene (MTS, 0.20 mL, 0.99 mmol) dissolved in tetrahydrofuran (20 mL) was added. The round bottom flask was previously sealed with a membrane and purged with argon gas. Then, hexyl methacrylate (HexMA, 2.2 mL, 11.2 mmol) was injected, and the temperature was raised from 20° C. to 33° C. After 30 minutes, the exothermic reaction was weak, and two 0.1 mL aliquots of the reaction solution were extracted and analyzed by GPC and $^1$H NMR, respectively. Afterwards, PEGMA (0.095 mL (a 50 vol % solution), 2.1 mmol, MW=500) dissolved in tetrahydrofuran was added and the temperature was raised from 25° C. to 27° C. Next, two 0.1 mL aliquots were extracted and analyzed by GPC and $^1$H NMR, respectively. Afterwards, 2-(dimethylamino)ethyl methacrylate (DMAEMA, 2.65 mL, 15.7 mmol) was added and the temperature was observed to rise from 22° C. to 34° C. The crude product was poured into hexane to induce precipitation, and the purified copolymer was filtered to remove small molecule impurities, obtaining a final product.

$^1$H NMR (400 MHz, $CDCl_3$) δ 0.90 (br, 50H), 1.00 (br, 21H), 1.32 (br, 46H), 1.61-1.68 (br, 23H), 1.81-1.98 (br, 31H), 2.28 (br, 58H), 2.56 (br, 19H), 3.38 (br, 3H), 3.55 (br, 3H), 3.64 (br, 18H), 3.92 (br, 14H), 4.06 (br, 21H).

Mn=6249 (THF); Mw=7811; PDI=1.25.

Example 3

To a round bottom flask (100 mL) containing the benzoic acid oxovanadium catalyst (2.5 mg), 1-methoxy-2-methyl-1-(trimethylsilyloxy)propene (MT S, 0.20 mL, 0.99 mmol) dissolved in tetrahydrofuran (20 mL) was added. The round bottom flask was previously sealed with a membrane and purged with argon gas. Then, a diacrylate compound (6.0 mL (a 33.3 vol % solution), 2.9 mmol) dissolved in tetrahydrofuran was added and the temperature was raised from 25° C. to 27° C. Next, two 0.1 mL aliquots were extracted and analyzed by GPC and $^1$H NMR, respectively. Afterwards, hexyl methacrylate (HexMA, 1.0 mL, 5.9 mmol) was injected, and the temperature was raised from 20° C. to 33° C. After 30 minutes, the exothermic reaction was weak, and two 0.1 mL aliquots of the reaction solution were extracted and analyzed by GPC and $^1$H NMR, respectively. The crude product was poured into hexane to induce precipitation, and the purified copolymer was filtered to remove small molecule impurities, obtaining a final product.

$^1$H NMR (400 MHz, CDCl$_3$) δ 0.99-1.18 (br, 10H), 1.32-1.35 (br, 7H), 1.62 (s, 8H), 1.95 (br, 3H), 3.64-3.71 (br, 17H), 3.83 (s, 2H), 3.95 (s, 2H), 6.79 (br, 2H), 7.11 (br, 2H).

Mn=6249 (THF); Mw=7811; PDI=1.25.

Dispersion Effect Test

The copolymer of Example 3 (1 g) and the commercially available dispersant (1 g) were dissolved in 1 mL of tetrahydrofuran, into which 135 uL of yellow pigment (from a solution of 500 mg yellow pigment in 3 mL of tetrahydrofuran) was added, followed by grinding and stirring for 30 seconds. The dispersion of the yellow pigment was observed and shown in Table 1.

TABLE 1

| | Dispersion effect | Particle suspension |
|---|---|---|
| Copolymer of Example 2 | Excellent | No particle suspension or uneven dispersion |
| Copolymer of Example 3 | Excellent | No particle suspension or uneven dispersion |
| Commercially available dispersant | Good | Significant particle suspension |

The above specific embodiments are to be construed as illustrative only and do not limit the remainder of this disclosure in any way.

Although the present invention has been explained in relation to its preferred embodiment, it is to be understood that many other possible modifications and variations can be made without departing from the spirit and scope of the invention as hereinafter claimed.

What is claimed is:

1. A method for preparing a block copolymer, comprising:
   (A) mixing a compound of formula (I), a catalyst of formula (II), and a first solvent to obtain a first mixture:

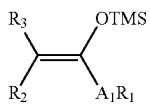

(I)

wherein A$_1$ is a bond, O, or S;
R$_1$, R$_2$, and R$_3$ are each independently H, a C$_{1-6}$ alkyl, —COOR$_4$, or —CH$_2$P(=O)R$_5$R$_6$; or R$_1$ and R$_2$ are bonded to each other to form a C$_{4-8}$ cycloalkyl group or a C$_{3-7}$ heterocycloalkyl group; or R$_2$ and R$_3$ are bonded to each other to form a C$_{5-8}$ cycloalkyl group; and OTMS is OSiMe$_3$;
wherein R$_4$, R$_5$, and R$_6$ are each independently a C$_{1-6}$ alkyl, a C$_{1-6}$ alkoxyl, -OTMS, or an amino group substituted by a C$_{1-6}$ alkyl;

$$[M(O)_a]^{m+}X_b^{n-}$$ (II)

wherein M(O)$_a$ is VO, VO$_3$, ZrO, HfO, WO$_2$, MoO$_2$, CrO$_2$, or ReO$_3$;
X is Cl, Br, I, OAc, OC(O)Ar, OC(O)(CF$_2$)$_c$CF$_3$, OC(O)C$_{12}$H$_{25}$, OTf, OTs, SO$_4$, SO$_3$C$_{12}$H$_{25}$, acetylacetonate (acac), or a mixture thereof;
b is an integer from 1 to 4;
m is an integer from 2 to 4;
n is an integer from 1 to 2;
c is an integer from 1 to 6;

Ar is a C$_{6-20}$ aryl;
Ac is C(O)CH$_3$;
Tf is trifluoromethylsulfonyl, and
Ts is toluenesulfonyl;
(B) adding a first monomer into the first mixture to obtain a second mixture; and
(C) adding a second monomer into the second mixture to obtain a third mixture.

2. The method according to claim 1, further comprising a step of (D) adding the third mixture into a second solvent.

3. The method according to claim 2, wherein the second solvent is water, an alcohol, a C$_{5-10}$ alkane, or a mixture thereof.

4. The method according to claim 1, wherein the first monomer and the second monomer are each independently an acrylate compound.

5. The method according to claim 1, wherein the first monomer and the second monomer are each independently a compound of formula (III) below:

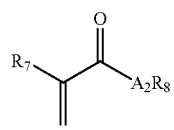

(III)

wherein A$_2$ is O or S;
R$_7$ is H, or a C$_{1-6}$ alkyl; and
R$_8$ is a C$_{1-12}$ alkyl, (CH$_2$)$_q$N(R$_{11}$)$_2$, CH$_2$(CH$_2$OCH$_2$)$_r$CH$_2$N(R$_{12}$)$_2$, or CH$_2$(CH$_2$OCH$_2$)$_s$CH$_2$OR$_{13}$;
wherein R$_{11}$, R$_{12}$, and R$_{13}$ are each independently a C$_{1-6}$ alkyl; and q, r, and s are each independently an integer from 1 to 10.

6. The method according to claim 1, wherein the first monomer and the second monomer are each independently a compound of formula (IV) below:

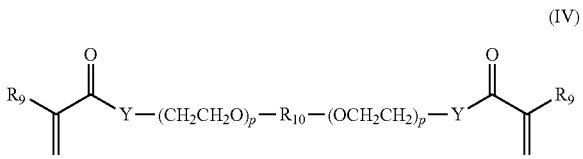

(IV)

wherein Y is O, NH, or S;
R$_9$ is H or a C$_{1-6}$ alkyl;
R$_{10}$ is a C$_{1-6}$ alkyl or a C$_{6-20}$ aryl; and
p is an integer from 1 to 12.

7. The method according to claim 1, further comprising adding a third monomer into the third mixture to obtain a fourth mixture after obtaining the third mixture in step (C).

8. The method according to claim 7, further comprising a step of (E) adding the fourth mixture into a second solvent.

9. The method according to claim 8, wherein the second solvent is water, an alcohol, a C$_{5-10}$ alkane, or a mixture thereof.

10. The method according to claim 7, wherein the first monomer, the second monomer, and the third monomer are each independently an acrylate compound.

11. The method according to claim 1, wherein the first solvent is an ether solvent.

12. The method according to claim 1, wherein the catalyst is present in an amount of 0.1 wt % to 20 wt %, based on a total weight of the first mixture.

* * * * *